United States Patent
Sun et al.

(10) Patent No.: US 10,614,592 B2
(45) Date of Patent: Apr. 7, 2020

(54) THREE-DIMENSIONAL POSTURE ESTIMATING METHOD AND APPARATUS, DEVICE AND COMPUTER STORAGE MEDIUM

(71) Applicant: BAIDU ONLINE NETWORK TECHNOLOGY (BEIJING) CO., LTD., Haidian District Beijing (CN)

(72) Inventors: Xun Sun, Beijing (CN); Rui Wang, Beijing (CN); Yuqiang Zhai, Beijing (CN); Tian Xia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/022,009

(22) Filed: Jun. 28, 2018

(65) Prior Publication Data

US 2019/0012807 A1 Jan. 10, 2019

(30) Foreign Application Priority Data

Jul. 4, 2017 (CN) .......................... 2017 1 0538045

(51) Int. Cl.
*G06T 7/73* (2017.01)
*G06T 7/60* (2017.01)
*G06N 7/00* (2006.01)
*G06N 20/00* (2019.01)

(52) U.S. Cl.
CPC ............... *G06T 7/75* (2017.01); *G06N 7/005* (2013.01); *G06T 7/60* (2013.01); *G06T 7/73* (2017.01); *G06N 20/00* (2019.01); *G06T 2207/20081* (2013.01); *G06T 2207/20084* (2013.01); *G06T 2207/20108* (2013.01); *G06T 2207/30252* (2013.01); *G06T 2207/30261* (2013.01)

(58) Field of Classification Search
None
See application file for complete search history.

(56) References Cited

U.S. PATENT DOCUMENTS

| 2017/0154204 A1* | 6/2017 | Ryu ................... G06K 9/00208 |
| 2018/0268601 A1* | 9/2018 | Rad ........................ G06T 15/205 |
| 2018/0349746 A1* | 12/2018 | Vallespi-Gonzalez ...................... G06K 9/6277 |

* cited by examiner

*Primary Examiner* — Yi Wang
(74) *Attorney, Agent, or Firm* — Brooks Kushman PC

(57) ABSTRACT

The present disclosure provides a three-dimensional posture estimating method and apparatus, a device and a computer storage medium, wherein the method comprises: obtaining two-dimensional posture information of an object in an image and three-dimensional size information of the object; determining coordinates of key points of the object in an object coordinate system according to the three-dimensional size information of the object; determining a transformation relationship between a camera coordinate system and the object coordinate system according to a geometrical relationship between coordinates of key points of the object in the object coordinate system and the two-dimensional posture information of the object. Application of this manner to the field of autonomous driving may implement mapping a detection result of a two-dimensional obstacle to a three-dimensional space to obtain its posture.

17 Claims, 5 Drawing Sheets

THREE-DIMENSIONAL POSTURE ESTIMATING METHOD AND APPARATUS, DEVICE AND COMPUTER STORAGE MEDIUM

The present application claims the priority of Chinese Patent Application No. 201710538045.8, filed on Jul. 4, 2017, with the title of "Three-dimensional posture estimating method and apparatus, device and computer storage medium". The disclosure of the above applications is incorporated herein by reference in its entirety.

FIELD OF THE DISCLOSURE

The present disclosure relates to the technical field of computer application, and particularly to a three-dimensional posture estimating method and apparatus, a device and a computer storage medium.

BACKGROUND OF THE DISCLOSURE

In order to ensure safety of an autonomous vehicle traveling on a road, it is necessary to detect, in real time, three-dimensional location information of obstacles in a surrounding environment, and feed the three-dimensional location information back to a planning control system so as to perform avoiding operations. Currently, the technology of performing obstacle detection on images based on the deep learning technology develops rapidly. However, due to lack of three-dimensional information, only a two-dimensional detection result on images cannot be applied to all autonomous vehicle driving scenarios. Currently, it is desirable to provide a manner of mapping a detection result of the two-dimensional obstacle to a three-dimensional space and obtaining its posture, so as to pave a foundation for applying obstacle detection based on the computer vision technology to autonomous diving projects.

SUMMARY OF THE DISCLOSURE

In view of the above, the present disclosure provides a three-dimensional posture estimating method and apparatus, a device and a computer storage medium, to facilitate mapping a detection result of a two-dimensional obstacle to a three-dimensional space to obtain its posture.

Specific technical solutions are as follows:

The present disclosure provides a three-dimensional posture estimating method, the method comprising:

obtaining two-dimensional posture information of an object in an image and three-dimensional size information of the object;

determining coordinates of key points of the object in an object coordinate system according to the three-dimensional size information of the object;

determining a transformation relationship between a camera coordinate system and the object coordinate system according to a geometrical relationship between coordinates of key points of the object in the object coordinate system and the two-dimensional posture information of the object.

According to a specific implementation mode of the present disclosure, the method further comprising:

determining coordinates of the key points of the object in the camera coordinate system, according to coordinates of the key points of the object in the object coordinate system and the transformation relationship.

According to a specific implementation mode of the present disclosure, the two-dimensional posture information of the object in the image and the three-dimensional size information of the object are obtained based on a deep learning method.

According to a specific implementation mode of the present disclosure, the two-dimensional posture information of the object in the image comprises: projection coordinates of the key points of the object on the image.

According to a specific implementation mode of the present disclosure, the determining a transformation relationship between a camera coordinate system and the object coordinate system according to a geometrical relationship between coordinates of key points of the object in the object coordinate system and the two-dimensional posture information of the object comprises:

enabling the coordinates of the key points of the object in the object coordinate system and the projection coordinates on the image to respectively constitute 3D-2D coordinate pairs of respective key points;

using a geometrical correspondence relationship of 3D-2D coordinate pairs of at least partial key points to determine a rotation matrix R and a position translation vector t from the object coordinate system to the camera coordinate system.

According to a specific implementation mode of the present disclosure, the using a geometrical correspondence relationship of 3D-2D coordinate pairs of at least partial key points to determine a rotation matrix R and a position translation vector t from the object coordinate system to the camera coordinate system comprises:

using the geometrical correspondence relationship of 3D-2D coordinate pairs of m key points to form m groups of equations, m being a positive integer;

using a PnP algorithm to solve said m groups of equations, to obtain the rotation matrix R and the position translation vector t from the object coordinate system to the camera coordinate system, wherein m n.

According to a specific implementation mode of the present disclosure, during use of a PnP algorithm to solve said m groups of equations, a Random Sample Consensus RANSAC algorithm is employed to select a solution with a maximum interior point rate.

According to a specific implementation mode of the present disclosure, the two-dimensional posture information of the object in the image comprises: a minimum two-dimensional rectangular box in the image that can enclose the object;

the method further comprises: obtaining a rotation angle yaw of the object about the camera coordinate system based on a deep learning method.

According to a specific implementation mode of the present disclosure, the determining a transformation relationship between a camera coordinate system and the object coordinate system according to a geometrical relationship between coordinates of key points of the object in the object coordinate system and the two-dimensional posture information of the object comprises:

determining a rotation matrix R from the object coordinate system to the camera coordinate system according to the yaw;

determining a position translation vector t from the object coordinate system to the camera coordinate system, according to a coordinate relationship between the minimum two-dimensional rectangular box and key points of the object falling at the minimum two-dimensional rectangular box, and the R.

According to a specific implementation mode of the present disclosure, the determining a position translation vector t from the object coordinate system to the camera coordinate system, according to a coordinate relationship between the minimum two-dimensional rectangular box and key points of the object falling at the minimum two-dimensional rectangular box, and the R comprises:

with respect to sides of the minimum two-dimensional rectangular box, using the R and internal parameters of the camera to form four groups of equations, each group of equation reflecting a positional relationship between key points falling at the minimum two-dimensional rectangular box and the two-dimensional rectangular box;

using a least square method to solve the four groups of equations, and determining the t.

According to a specific implementation mode of the present disclosure, the key points comprise: apexes of a minimum three-dimensional rectangular box that encloses the object.

According to a specific implementation mode of the present disclosure, the object comprises: an obstacle.

The present disclosure provides a three-dimensional posture estimating apparatus, the apparatus comprising:

an obtaining unit configured to obtain two-dimensional posture information of an object in an image and three-dimensional size information of the object;

a first determining unit configured to determine coordinates of key points of the object in an object coordinate system according to the three-dimensional size information of the object;

a second determining unit configured to determine a transformation relationship between a camera coordinate system and the object coordinate system according to a geometrical relationship between coordinates of key points of the object in the object coordinate system and the two-dimensional posture information of the object.

According to a specific implementation mode of the present disclosure, the apparatus further comprises:

a third determining unit configured to determine coordinates of the key points of the object in the camera coordinate system, according to coordinates of the key points of the object in the object coordinate system and the transformation relationship.

According to a specific implementation mode of the present disclosure, the two-dimensional posture information of the object in the image obtained by the obtaining unit comprises: projection coordinates of the key points of the object on the image.

According to a specific implementation mode of the present disclosure, the second determining unit specifically performs:

enabling the coordinates of the key points of the object in the object coordinate system and the projection coordinates on the image to respectively constitute 3D-2D coordinate pairs of respective key points;

using a geometrical correspondence relationship of 3D-2D coordinate pairs of at least partial key points to determine a rotation matrix R and a position translation vector t from the object coordinate system to the camera coordinate system.

According to a specific implementation mode of the present disclosure, the two-dimensional posture information of the object in the image obtained by the obtaining unit comprises: a minimum two-dimensional rectangular box in the image that can enclose the object;

the obtaining unit is further configured to obtain a rotation angle yaw of the object about the camera coordinate system based on a deep learning method.

According to a specific implementation mode of the present disclosure, the second determining unit specifically performs:

determining a rotation matrix R from the object coordinate system to the camera coordinate system according to the yaw;

determining a position translation vector t from the object coordinate system to the camera coordinate system, according to a coordinate relationship between the minimum two-dimensional rectangular box and key points of the object falling at the minimum two-dimensional rectangular box, and the R.

The present disclosure provides a device, comprising:
one or more processors,
a storage for storing one or more programs,
the one or more programs, when executed by said one or more processors, enable said one or more processors to implement the above-mentioned method.

The present disclosure further provides a storage medium including computer-executable instructions, the computer-executable instructions, when executed by a computer processor, being used to execute the above method.

As can be seen from the above technical solution, the transformation relationship between the camera coordinate system and the object coordinate system is determined based on the two-dimensional posture information of the object in the image and the three-dimensional size information of the object, and in accordance with the geometrical relationship between coordinates of key points of the object in the object coordinate system and the two-dimensional posture information of the object. Application of this manner to the field of autonomous driving may implement mapping a detection result of a two-dimensional obstacle to a three-dimensional space to obtain its posture.

DETAILED DESCRIPTION OF PREFERRED EMBODIMENTS

The present disclosure will be described in detail with reference to figures and specific embodiments to make objectives, technical solutions and advantages of the present disclosure more apparent.

The present disclosure is based on an assumption that two-dimensional posture information of an object in an image and three-dimensional size information of the object are already acquired. A core idea of the present disclosure lies in determining a transformation relationship between a camera coordinate system and an object coordinate system based on a geometrical relationship between coordinates of key points of the object in the image in the object coordinate system and the two-dimensional posture information of the object, and mapping the two-dimensional object information to a three-dimensional space according to the transformation relationship, thereby obtaining its three-dimensional posture.

Figure 1:
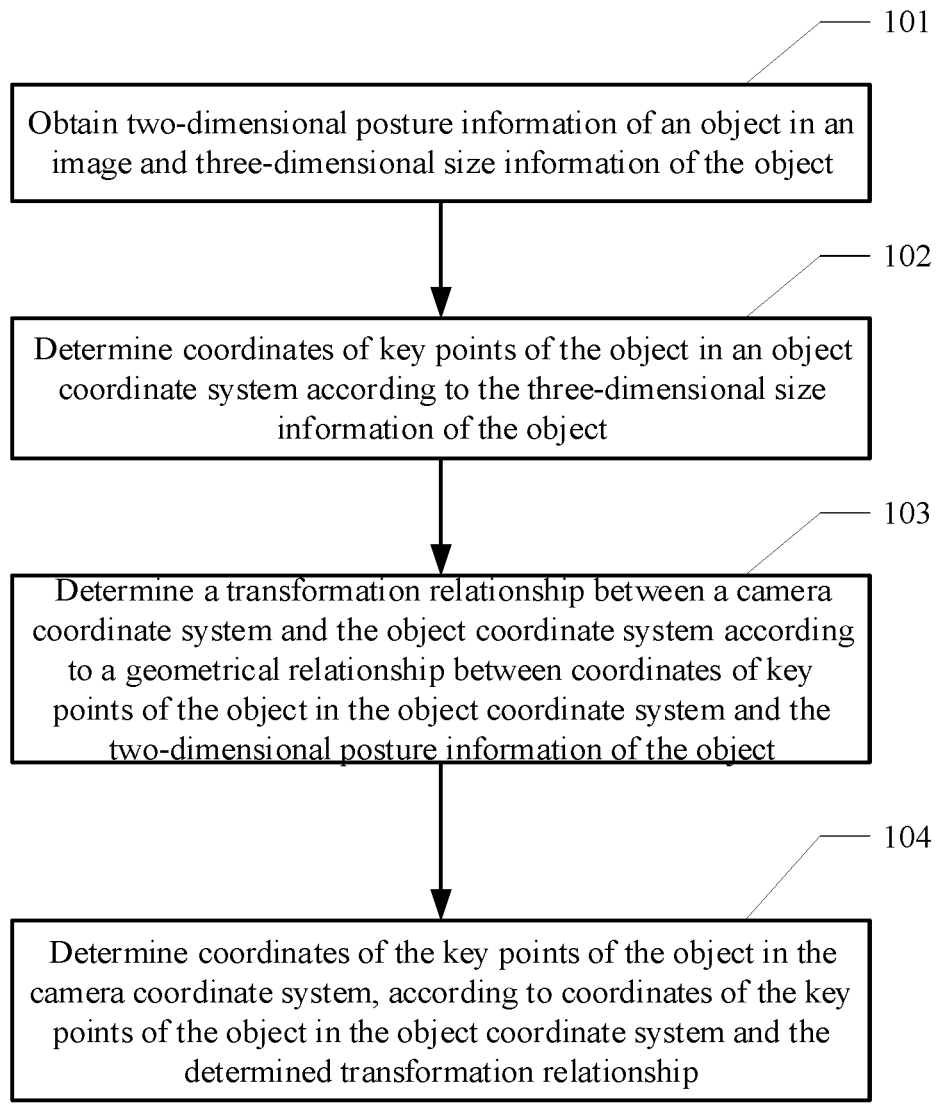
FIG. 1 is a flow chart of a main method according to an embodiment of the present disclosure.

FIG. 1 is a flow chart of a main method according to an embodiment of the present disclosure. As shown in FIG. 1, the method may comprise:

In 101, two-dimensional posture information of an object in an image and three-dimensional size information of the object are obtained.

In the embodiment of the present disclosure, it is assumed that the two-dimensional posture information of the object in the image and the three-dimensional size information of the object are already known. In the present disclosure, these information is directly used to perform three-dimensional posture estimation of the object in the image. Hence, in the present disclosure, the manner of obtaining the two-dimensional posture information of the object in the image and the three-dimensional size information of the object is not limited, and may be obtained based on a deep learning method or in any other feasible manner.

The three-dimensional size information of the object may be reflected as length, width and height of the object. The two-dimensional posture information of the object in the image may be reflected in many manners, for example, reflected as projection coordinates of key points of the object on the image, and again for example, reflected as a minimum two-dimensional rectangular box in the image that can enclose the object. Regarding different reflection manners, different manners may be used to determine the transformation relationship between the camera coordinate system and the object coordinate system. Detailed depictions will be presented subsequently in combination with different embodiments.

In 102, coordinates of the key points of the object in the object coordinate system are determined according to the three-dimensional size information of the object.

Figure 2:
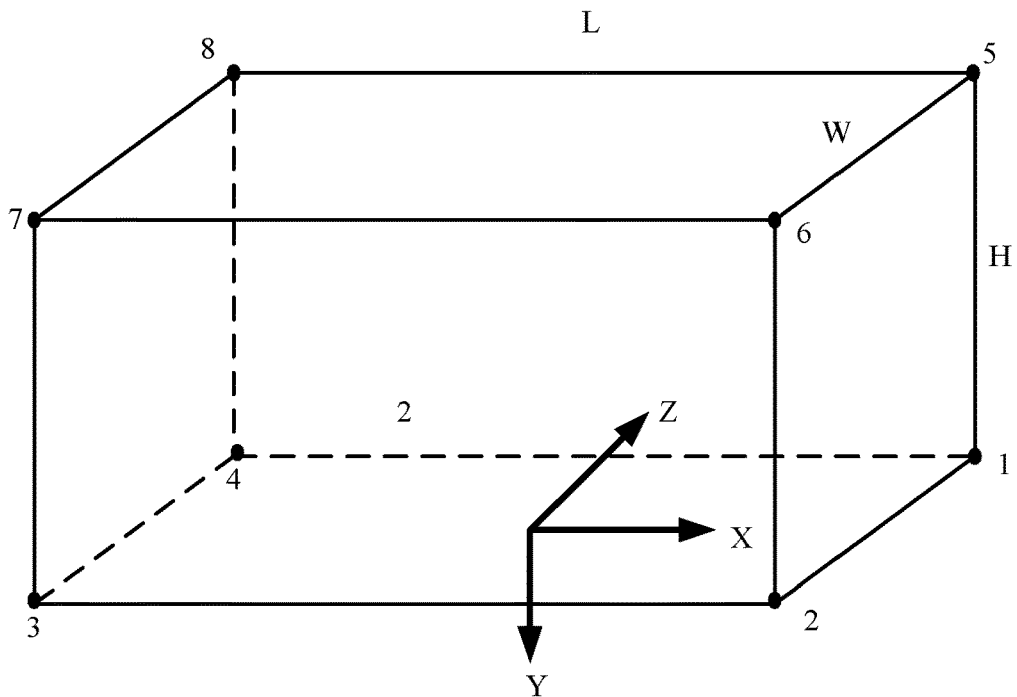
FIG. 2 is a schematic diagram of coordinates a key point of an object in an object coordinate system according to an embodiment of the present disclosure.

Usually, an object is represented with n points in the three-dimensional space, may be represented with apexes of the minimum three-dimensional rectangular box enclosing the object, or may be represented with points such as a center and a barycenter of the object. In addition, according to the difference of object types, a specific representation manner may be selected according to a specific type of object. Considering requirements for generality, in the embodiment of the present disclosure, a 3D enclosing box (namely, a minimum three-dimensional rectangular box enclosing the object) of eight points may be used to represent the object. As shown in FIG. 2, on the object, a center of a bottom surface of the object is considered as an origin to build an object coordinate system, wherein length, width and height respectively correspond to X axis direction, Y axis direction and Z axis direction, and numbering is performed according to eight apexes as shown in the figure. A front side surface, a left side surface, a rear side surface and a right side surface of the object correspond to apex sets {1,2,6,5}, {1,4,8,5}, {3,4,8,7} and {2,3,7,6} in turn.

If the length, width and height of the 3D enclosing box are L, H and W respectively, coordinates of the 1-8 apexes in the object coordinate system may be represented respectively as:

$$\left(\frac{L}{2}, 0, \frac{W}{2}\right)$$

$$\left(\frac{L}{2}, 0, -\frac{W}{2}\right)$$

$$\left(-\frac{L}{2}, 0, -\frac{W}{2}\right)$$

$$\left(-\frac{L}{2}, 0, \frac{W}{2}\right)$$

$$\left(\frac{L}{2}, -H, \frac{W}{2}\right)$$

$$\left(\frac{L}{2}, -H, -\frac{W}{2}\right)$$

$$\left(-\frac{L}{2}, -H, -\frac{W}{2}\right)$$

$$\left(-\frac{L}{2}, -H, \frac{W}{2}\right)$$

In 103, the transformation relationship between the camera coordinate system and the object coordinate system is determined according to the geometrical relationship between coordinates of key points of the object in the object coordinate system and the two-dimensional posture information of the object.

In the embodiment of the present disclosure, the transformation relationship between the camera coordinate system and the object coordinate system is determined based on the geometrical relationship. If a rotation angle yaw of the object about the camera coordinate system is unknown, the transformation relationship obtained in this step may include a rotation matrix R and a position translation vector t from the object coordinate system to the camera coordinate system. If the rotation angle yaw of the object about the camera coordinate system is known, the transformation relationship obtained in this step may include the position translation vector t from the object coordinate system to the camera coordinate system.

The transformation relationship from the object coordinate system to the camera coordinate system may be represented as follows:

$$R * X_{object} + t = X_{camera} \quad (1)$$

where the rotation matrix R is a 3×3 matrix, t is a 3×1 vector, and $X_{object}$ and $X_{camera}$ are respectively coordinates of the same point in the object coordinate system and the camera coordinate system respectively.

In 104, coordinates of the key points of the object in the camera coordinate system are determined according to coordinates of the key points of the object in the object coordinate system and the above-determined transformation relationship.

After the transformation relationship is determined, the coordinates of the key points of the object in the camera coordinate system may be determined from the coordinates of the key points of the object in the object coordinate system by employing the equation (1).

It needs to be appreciated that the object in the image may be any object with a specific shape. In subsequent embodiments of the present disclosure, for example, if the object is applied to the field of autonomous vehicles, the object in the image mainly refers to an obstacle, and specifically mainly refers to a "complete" object which is potentially movable in an environment surrounding the autonomous vehicle, for example, a vehicle, a pedestrian, a bicycle or the like.

The above method is described below in detail in conjunction with two specific embodiments.

Embodiment 1

Figure 3:
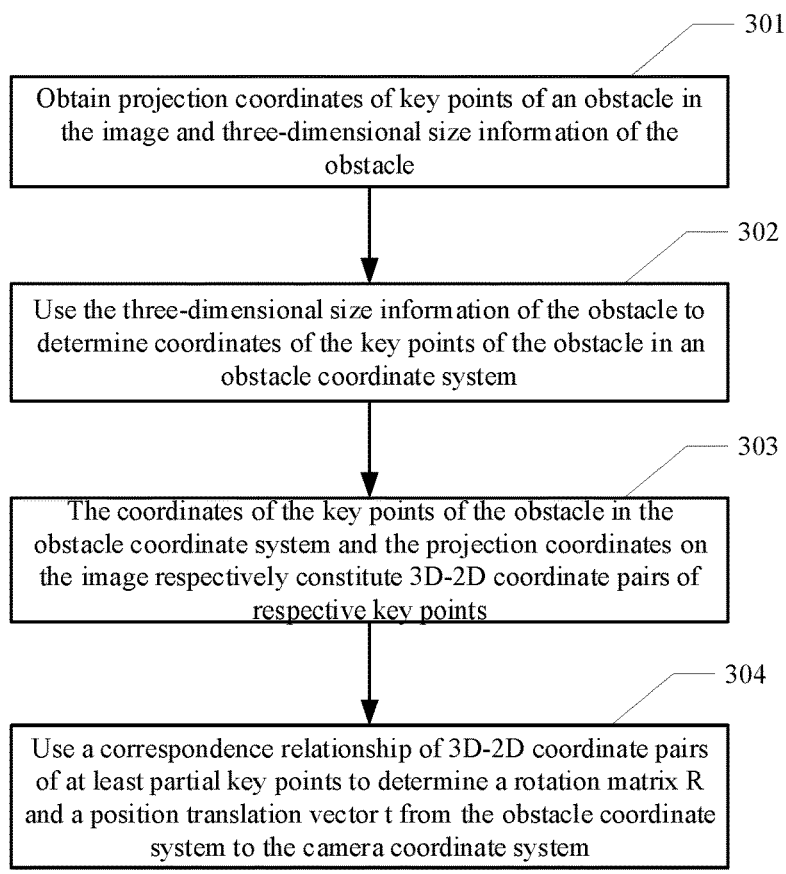
FIG. 3 is a flow chart of a method according to a first embodiment of the present disclosure.

FIG. 3 is a flow chart of a method according to a first embodiment of the present disclosure. As shown in FIG. 3, the method may include the following steps:

301: obtaining projection coordinates of key points of an obstacle in the image and three-dimensional size information of the obstacle.

As far as the obstacle is concerned, an example is taken in which the eight apexes of the 3D enclosing box are considered as key points. The eight apexes have eight projection coordinates on the image, which may be respectively represented as $q_i$, wherein i=1, 2, . . . , 8. The three-dimensional size information of the obstacle is reflected as length, width and height. In addition, it is possible to use a center point, a barycenter and the like of each plane of for example 3D enclosing box as key points.

In 302, the three-dimensional size information of the obstacle is used to determine coordinates of the key points of the obstacle in an obstacle coordinate system.

This step is not detailed any more, and reference may be made to related depictions in step 102 shown in FIG. 1.

In 303, the coordinates of the key points of the obstacle in the obstacle coordinate system and the projection coordinates on the image respectively constitute 3D-2D coordinate pairs of respective key points.

Assuming that the coordinates of the eight apexes of the obstacle in the obstacle coordinate system are represented as $Q_i$, wherein i=1, 2, . . . 8, $Q_i$-$q_i$ form a 3D-2D coordinate pair with respect to each i.

In 304, a correspondence relationship of 3D-2D coordinate pairs of at least partial key points on a set is used to determine a rotation matrix R and a position translation vector t from the obstacle coordinate system to the camera coordinate system.

In this step, it is feasible to use the correspondence relationship of 3D-2D coordinate pairs of m key points on the set to form m groups of equations, m being a positive integer; then use a PnP algorithm to solve m groups of equations, to obtain R and t from the obstacle coordinate system to the camera coordinate system, wherein m≥n.

For example, assuming $P=K[R\ t]$ (2)

where P is a 3×4 matrix, and the problem of determining R and t is transformed into a problem of solving P:

$PQ_i=s \cdot q_i$ (3)

where s is a vector formed by Z-axis coordinate in $Q_i$.

According to equation (3), each apex may form a group of equation, and eight 3D-2D coordinate pairs may form eight groups of equations.

A typical algorithm, PnP algorithm, in computer vision may be employed to solve the above equations. For example, in the case that internal parameters of the camera are known, P3P algorithm is employed to solve four groups of equations formed by four apexes. Again for example, in the case that internal parameters of the camera are not known, an algorithm such as P4P or P6P may be employed.

During the solving, Random Sample Consensus (RANSAC) algorithm may be employed to select a solution with a maximum interior point rate. For example, Assuming that the internal parameters of the camera are known, P3P is employed to solve four groups of equations formed by four 3D-2D coordinate pairs. A rough process is as follows:

S1: first, randomly sampling four $Q_i$-$q_i$ pairs;

S2: invoking P3P algorithm to obtain a solution;

S3: judging an inner point rate of the solution obtained in S2; if the interior point rate is larger than a maximum interior point rate, using the interior point rate to update the maximum interior point rate, and using the solution obtained from S2 to update the current solution;

S4: judging whether a stopping condition is satisfied, and if yes, executing S5; otherwise turning to execute S1, wherein the stopping condition may include but not limited to: the number of interior points satisfies a preset requirement, or times of iteration satisfy a preset requirement.

S5: re-fitting by using all interior points (e.g., using a least square method), to obtain an optimal solution.

Since RANSAC algorithm is a known algorithm, the above process is summarized so far.

After the above solving, the optimal solution P may be obtained, namely, R and t are obtained.

Embodiment 2

Figure 4:
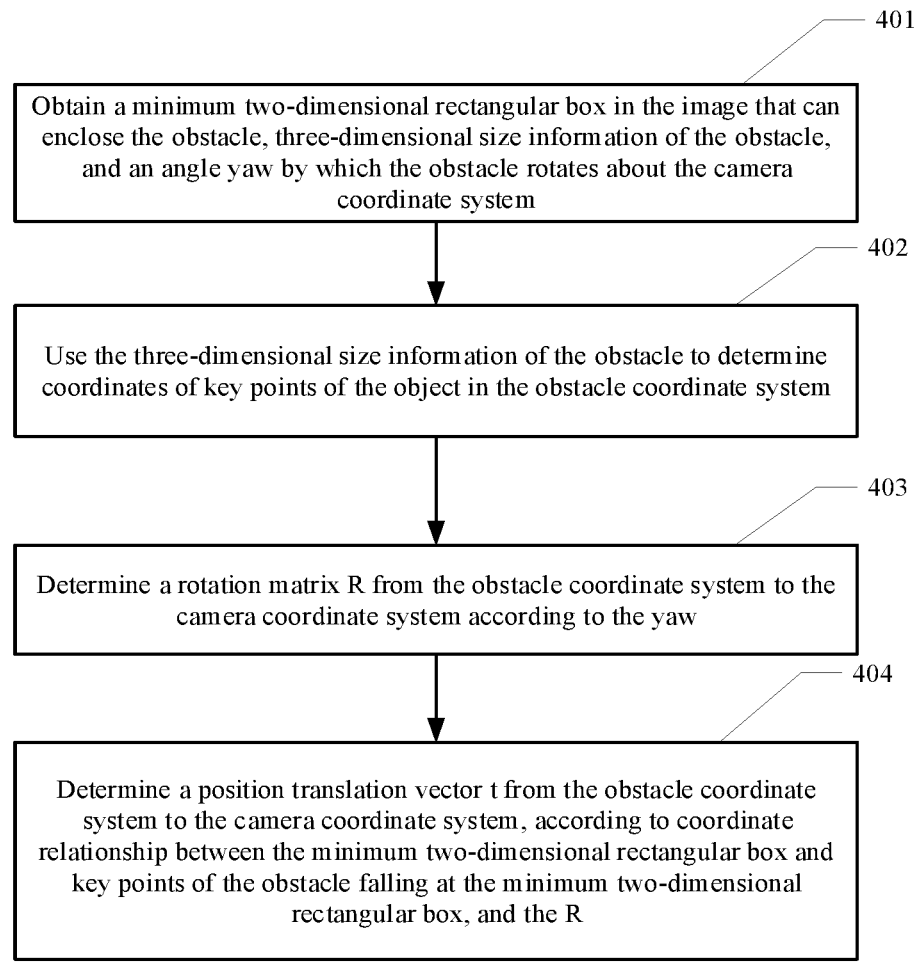
FIG. 4 is a flow chart of a method according to a second embodiment of the present disclosure.

FIG. 4 is a flow chart of a method according to a second embodiment of the present disclosure. as shown in FIG. 4, the method may comprise the following steps:

401 relates to obtaining a minimum two-dimensional rectangular box in the image that can enclose the obstacle, three-dimensional size information of the obstacle, and an angle yaw by which the obstacle rotates about the camera coordinate system.

Figure 5:
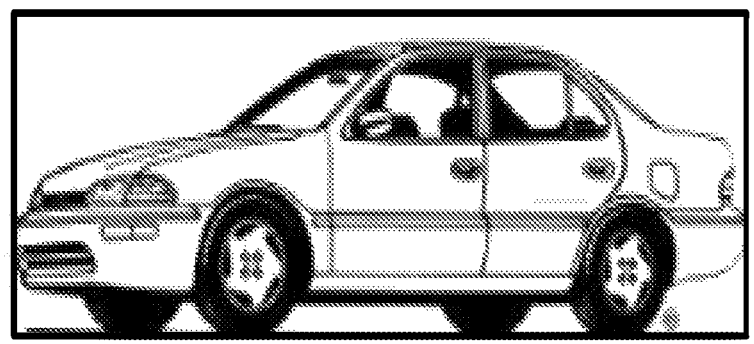
FIG. 5 is a schematic diagram of a minimum two-dimensional rectangular box according to an embodiment of the present disclosure.

For example, as shown in FIG. 5, the minimum two-dimensional rectangular box in the image that can enclose a vehicle is as shown by a black-line box in the figure.

The present embodiment is based on an assumption that the angle yaw by which the obstacle rotates about the camera coordinate system is known, wherein the manner of obtaining yaw may be based on a deep learning method, or employ other manners. This is not limited by the present disclosure.

402 relates to using the three-dimensional size information of the obstacle to determine coordinates of key points of the object in the obstacle coordinate system.

This step is not detailed any more, and reference may be made to related depictions in step 102 shown in FIG. 1.

403 relates to determining a rotation matrix R from the obstacle coordinate system to the camera coordinate system according to the yaw.

With the yaw being given, the rotation matrix R may be obtained as follows:

$$R = \begin{bmatrix} \cos(\text{yaw}) & 0 & \sin(\text{yaw}) \\ 0 & 1 & 0 \\ -\sin(\text{yaw}) & 0 & \cos(\text{yaw}) \end{bmatrix} \quad (4)$$

404 relates to determining a position translation vector t from the obstacle coordinate system to the camera coordinate system, according to coordinate relationship between the minimum two-dimensional rectangular box and key points of the obstacle falling at the minimum two-dimensional rectangular box, and the R.

As can be seen from geometrical relationship, each side of the minimum two-dimensional rectangular box that can enclose the obstacle certainly goes in a way that projection of at least one apex on the image exactly falls thereon. Based on such assumption, four groups of equations may be listed for four sides of the minimum two-dimensional rectangular box.

Assuming that the coordinates of apex 1 in the obstacle coordinate system is $$\left(\frac{L}{2}, 0, \frac{W}{2}\right),$$

it falls on the left side of the minimum two-dimensional rectangular box, and may be written into the following equation:

$$x_{left} = \left[K[R\ t] \begin{bmatrix} \frac{L}{2} \\ 0 \\ \frac{W}{2} \\ 1 \end{bmatrix}\right]_x \quad (5)$$

where the subscript x represents taking x coordinate projecting on the image, and $x_{left}$ represents the coordinate of the left side of the minimum two-dimensional rectangular box on the X axis.

Regarding the equation shown in equation (5), four groups of equations may be listed for four sides of the minimum two-dimensional rectangular box, and then the least square method is used to solve the four groups of equations, and thereby t is determined.

In addition, since it is possible that more than four key points fall on four sides, combination of other key points may be employed to form four groups of equations and thereby obtain a plurality of t. In this case, an optimal t may be selected from these obtained t. For example, one t may be selected so that a Jarcard index of the minimum two-dimensional rectangular box corresponding to t and including apexes of the obstacle and the minimum two-dimensional rectangular box obtained in step 401 is the largest, wherein the Jarcard index represents a ratio of area intersection to area intersection of the two minimum two-dimensional rectangular boxes.

In addition, besides the modes shown in the above Embodiment 1 and Embodiment 2, it is further possible to refer to modes in Embodiment 1 and Embodiment 2, and then evaluate results in Embodiment 1 and Embodiment 2, and select an optimal result therefrom.

Figure 6:
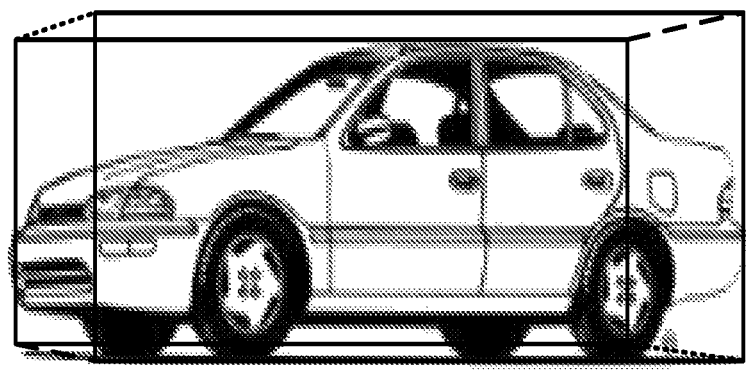
FIG. 6 is a schematic diagram of apexes of an obstacle in a camera coordinate system according to an embodiment of the present disclosure.

In the above-mentioned manner, it is feasible to, after R and t being obtained, determine coordinates of apexes of the obstacle in the camera coordinate system according to coordinates of apexes of the obstacle in the obstacle coordinate system, as shown in FIG. 6. On the one hand, the coordinates may provide basis for obstacle positioning of the autonomous vehicle and the vehicle control, and on the other hand, the coordinates of apexes of the obstacle in the camera coordinate system may be marked in the image.

The above shows detailed depictions of the method according to the present disclosure. The apparatus according to the present disclosure will be described below in detail.

Figure 7:
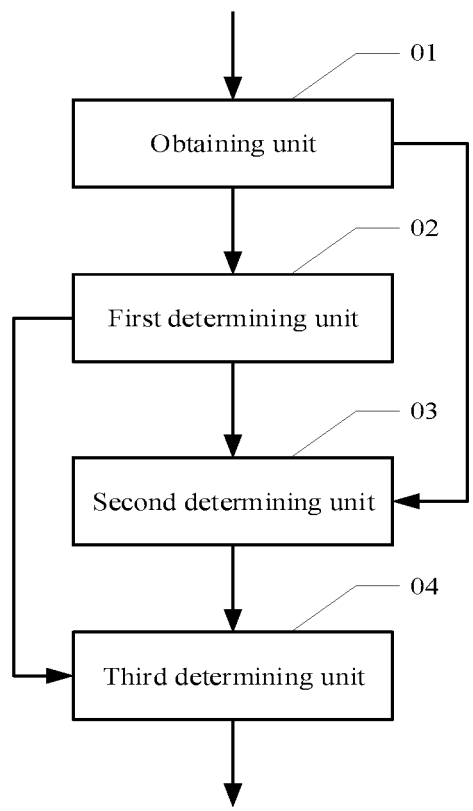
FIG. 7 is a structural schematic diagram of an apparatus according to an embodiment of the present embodiment.

FIG. 7 is a structural schematic diagram of an apparatus according to an embodiment of the present embodiment. As shown in FIG. 7, the apparatus may comprise: an obtaining unit 01, a first determining unit 02 and a second determining unit 03, and may further comprise a third determining unit 04. Main functions of the units forming the apparatus are as follows:

The obtaining unit 01 is configured to obtain two-dimensional posture information of an object in an image and three-dimensional size information of the object.

In the embodiment of the present disclosure, it is assumed that the two-dimensional posture information of the object in the image and the three-dimensional size information of the object are already known. In the present disclosure, these information is directly used to perform three-dimensional posture estimation of the object in the image. Hence, in the present disclosure, the manner of obtaining the two-dimensional posture information of the object in the image and the three-dimensional size information of the object is not limited, and may be obtained based on a deep learning method or in any other feasible manner. The three-dimensional size information of the object may be reflected as length, width and height of the object.

The first determining unit 02 is configured to determine coordinates of the key points of the object in an object coordinate system according to the three-dimensional size information of the object.

The second determining unit 03 is configured to determine a transformation relationship between the camera coordinate system and the object coordinate system according to a geometrical relationship between coordinates of key points of the object in the object coordinate system and the two-dimensional posture information of the object.

As an implementation mode, the two-dimensional posture information of the object in the image obtained by the obtaining unit 01 may comprise: projection coordinates of key points of the object on the image. Correspondingly, the second determining unit 03 enables the coordinates of the key points of the object in the object coordinate system and the projection coordinates on the image to respectively constitute 3D-2D coordinate pairs of respective key points; then uses a geometrical correspondence relationship of 3D-2D coordinate pairs of at least partial key points to determine a rotation matrix R and a position translation vector t from the object coordinate system to the camera coordinate system.

Specifically, it is feasible to use the geometrical correspondence relationship of 3D-2D coordinate pairs of m key points to form m groups of equations, m being a positive integer; then use a PnP algorithm to solve said m groups of equations, to obtain the rotation matrix R and the position translation vector t from the object coordinate system to the camera coordinate system, wherein m n.

During use of a PnP algorithm to solve said m groups of equations, Random Sample Consensus (RANSAC) algorithm may be employed to select a solution with a maximum interior point rate.

As another preferred implementation mode, the two-dimensional posture information of the object in the image obtained by the obtaining unit 01 may comprise: a minimum two-dimensional rectangular box in the image that can enclose the object; in addition, the obtaining unit 01 is further configured to obtain a rotation angle yaw of the object about the camera coordinate system based on a deep learning method.

Correspondingly, the second determining unit 03 may determine a rotation matrix R from the object coordinate system to the camera coordinate system according to the yaw; determine a position translation vector t from the object coordinate system to the camera coordinate system, according to a coordinate relationship between the minimum two-dimensional rectangular box and key points of the object falling at the minimum two-dimensional rectangular box, and the R.

Specifically, it is feasible to, with respect to sides of the minimum two-dimensional rectangular box, use the R and internal parameters of the camera to form four groups of equations, each group of equation reflecting a positional relationship between key points falling at the minimum two-dimensional rectangular box and the two-dimensional rectangular box; then use a least square method to solve the four groups of equations, and determine the t.

The key points may comprise eight apexes of the minimum three-dimensional rectangular box that encloses the object, and may further comprise for example a center and a barycenter of the object.

The third determining unit 04 is configured to determine coordinates of the key points of the object in the camera coordinate system, according to coordinates of the key points of the object in the object coordinate system and the transformation relationship.

Figure 8:
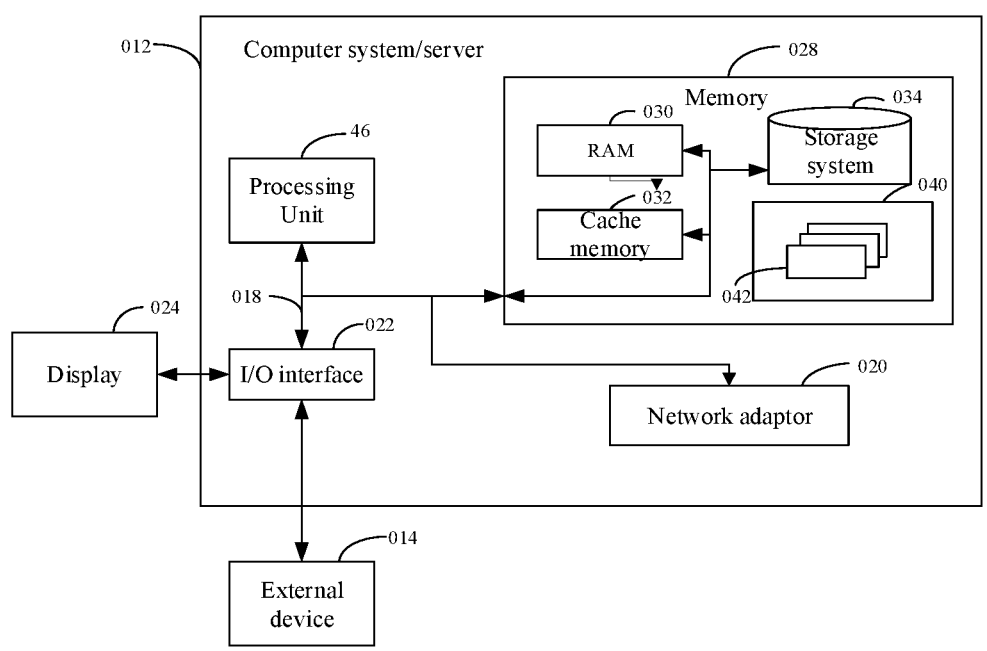
FIG. 8 is a block diagram of an example computer system/server adapted to implement an embodiment of the present disclosure.

FIG. 8 illustrates a block diagram of an example computer system/server 012 adapted to implement an implementation mode of the present disclosure. The computer system/server 012 shown in FIG. 8 is only an example and should not bring about any limitation to the function and scope of use of the embodiments of the present disclosure.

As shown in FIG. 8, the computer system/server 012 is shown in the form of a general-purpose computing device. The components of computer system/server 012 may include, but are not limited to, one or more processors (processing units) 016, a system memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

System memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The system memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement a three-dimensional posture estimating method, which may comprise:

obtaining two-dimensional posture information of an object in an image and three-dimensional size information of the object;

determining coordinates of key points of the object in an object coordinate system according to the three-dimensional size information of the object;

determining a transformation relationship between a camera coordinate system and the object coordinate system according to a geometrical relationship between coordinates of key points of the object in the object coordinate system and the two-dimensional posture information of the object.

The above-mentioned computer program may be set in a computer storage medium, i.e., the computer storage medium is encoded with a computer program. The program, when executed by one or more computers, enables said one or more computers to execute steps of methods and/or operations of apparatuses as shown in the above embodiments of the present disclosure. For example, steps of methods executed by said one or more processors may include:

obtaining two-dimensional posture information of an object in an image and three-dimensional size information of the object;

determining coordinates of key points of the object in an object coordinate system according to the three-dimensional size information of the object;

determining a transformation relationship between a camera coordinate system and the object coordinate system according to a geometrical relationship between coordinates of key points of the object in the object coordinate system and the two-dimensional posture information of the object.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As can be seen from the above depictions, the method, apparatus, device and computer storage medium according to the present disclosure may have the following advantages:

1) In the present disclosure, the transformation relationship between the camera coordinate system and the object coordinate system is determined based on the two-dimensional posture information of the object in the image and the three-dimensional size information of the object, and in accordance with the geometrical relationship between coordinates of key points of the object in the object coordinate system and the two-dimensional posture information of the object. Application of this manner to the field of unmanned driving may achieve mapping a detection result of a two-dimensional obstacle to a three-dimensional space to obtain its posture.

2) By using three-dimensional semantic information (namely, three-dimensional size information) obtained by deep learning and the reasoning based on geometrical constraint, the present disclosure greatly improves the efficiency and precision of rebuilding a specific obstacle.

3) Through verification in practical application, an average relative distance of the three-dimensional posture predicted in the manner provided by the present disclosure has an error of about 5-7%, at an advanced level in the industry. Meanwhile, the efficiency is very high. The average time for solving each obstacle three-dimensional posture is about 0.2 ms.

4) On the basis of the manner provided by the present method, the pressure of costs of a laser radar with a large number of lines may be substantially eased. Typically, environment perception is performed by employing a laser radar with a small number of lines (e.g., 16 lines or less)+Camera. In the future, it is even possible to consider using camera in place of the laser radar, further substantially reduce the costs, and spread the autonomous driving technology to commercialized market.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A three-dimensional posture estimating method, wherein the method comprises:
   obtaining two-dimensional posture information of an object in an image and three-dimensional size information of the object, wherein the three-dimensional size information comprises length, width and height of the object;
   determining coordinates of key points of the object in an object coordinate system according to the three-dimensional size information of the object, the coordinates of key points of the object are represented according to the length, width and height of the object; and
   determining a transformation relationship between a camera coordinate system and the object coordinate system according to a geometrical relationship between coordinates of key points of the object in the object coordinate system and the two-dimensional posture information of the object,
   wherein the two-dimensional posture information of the object in the image comprises: a minimum two-dimensional rectangular box in the image that can enclose the object;
   the method further comprises: obtaining a rotation angle yaw of the object about the camera coordinate system based on a deep learning method, and wherein the determining a transformation relationship between a camera coordinate system and the object coordinate system according to a geometrical relationship between coordinates of key points of the object in the object coordinate system and the two-dimensional posture information of the object comprises:

determining a rotation matrix R from the object coordinate system to the camera coordinate system according to the yaw;

determining a position translation vector t from the object coordinate system to the camera coordinate system, according to a coordinate relationship between the minimum two-dimensional rectangular box and key points of the object falling at the minimum two-dimensional rectangular box, and the R, and wherein the determining a position translation vector t from the object coordinate system to the camera coordinate system, according to a coordinate relationship between the minimum two-dimensional rectangular box and key points of the object falling at the minimum two-dimensional rectangular box, and the R, comprises:

with respect to sides of the minimum two-dimensional rectangular box, using the R and internal parameters of the camera to form four groups of equations, each group of equation reflecting a positional relationship between key points falling at the minimum two-dimensional rectangular box and the two-dimensional rectangular box;

using a least square method to solve the four groups of equations, and determining the t.

2. The method according to claim 1, wherein the method further comprises:

determining coordinates of the key points of the object in the camera coordinate system, according to coordinates of the key points of the object in the object coordinate system and the transformation relationship.

3. The method according to claim 2, wherein the key points comprise: apexes of a minimum three-dimensional rectangular box that encloses the object.

4. The method according to claim 1, wherein the two-dimensional posture information of the object in the image and the three-dimensional size information of the object are obtained based on a deep learning method.

5. The method according to claim 1, wherein the two-dimensional posture information of the object in the image comprises: projection coordinates of the key points of the object on the image.

6. The method according to claim 5, wherein the determining a transformation relationship between a camera coordinate system and the object coordinate system according to a geometrical relationship between coordinates of key points of the object in the object coordinate system and the two-dimensional posture information of the object comprises:

enabling the coordinates of the key points of the object in the object coordinate system and the projection coordinates on the image to respectively constitute 3D-2D coordinate pairs of respective key points;

using a geometrical correspondence relationship of 3D-2D coordinate pairs of at least partial key points to determine a rotation matrix R and a position translation vector t from the object coordinate system to the camera coordinate system.

7. The method according to claim 6, wherein the using a geometrical correspondence relationship of 3D-2D coordinate pairs of at least partial key points to determine a rotation matrix R and a position translation vector t from the object coordinate system to the camera coordinate system comprises:

using the geometrical correspondence relationship of 3D-2D coordinate pairs of m key points to form m groups of equations, m being a positive integer;

using a PnP algorithm to solve said m groups of equations, to obtain the rotation matrix R and the position translation vector t from the object coordinate system to the camera coordinate system, wherein the object is represented with n points in a three-dimensional space and m≥n.

8. The method according to claim 7, wherein during use of the PnP algorithm to solve said m groups of equations, a Random Sample Consensus RANSAC algorithm is employed to select a solution with a maximum interior point rate.

9. The method according to claim 1, wherein the object comprises: an obstacle.

10. A device, wherein the device comprises:
one or more processors,
a storage for storing one or more programs,
the one or more programs, when executed by said one or more processors, enable said one or more processors to implement a three-dimensional posture estimating method, wherein the method comprises:

obtaining two-dimensional posture information of an object in an image and three-dimensional size information of the object, wherein the three-dimensional size information comprises length, width and height of the object;

determining coordinates of key points of the object in an object coordinate system according to the three-dimensional size information of the object, the coordinates of key points of the object are represented according to the length, width and height of the object; and determining a transformation relationship between a camera coordinate system and the object coordinate system according to a geometrical relationship between coordinates of key points of the object in the object coordinate system and the two-dimensional posture information of the object, wherein the two-dimensional posture information of the object in the image comprises: a minimum two-dimensional rectangular box in the image that can enclose the object;

the method further comprises: obtaining a rotation angle yaw of the object about the camera coordinate system based on a deep learning method, and wherein the determining a transformation relationship between a camera coordinate system and the object coordinate system according to a geometrical relationship between coordinates of key points of the object in the object coordinate system and the two-dimensional posture information of the object comprises:

determining a rotation matrix R from the object coordinate system to the camera coordinate system according to the yaw;

determining a position translation vector t from the object coordinate system to the camera coordinate system, according to a coordinate relationship between the minimum two-dimensional rectangular box and key points of the object falling at the minimum two-dimensional rectangular box, and the R, and wherein the determining a position translation vector t from the object coordinate system to the camera coordinate system, according to a coordinate relationship between the minimum two-dimensional rectangular box and key points of the object falling at the minimum two-dimensional rectangular box, and the R, comprises:
  with respect to sides of the minimum two-dimensional rectangular box, using the R and internal parameters of the camera to form four groups of equations, each group of equation reflecting a positional relationship between key points falling at the minimum two-dimensional rectangular box and the two-dimensional rectangular box;
  using a least square method to solve the four groups of equations, and determining the t.

11. The device according to claim 10, wherein the method further comprises:
  determining coordinates of the key points of the object in the camera coordinate system, according to coordinates of the key points of the object in the object coordinate system and the transformation relationship.

12. The device according to claim 10, wherein the two-dimensional posture information of the object in the image and the three-dimensional size information of the object are obtained based on a deep learning method.

13. The device according to claim 10, wherein the two-dimensional posture information of the object in the image comprises: projection coordinates of the key points of the object on the image.

14. The device according to claim 13, wherein the determining a transformation relationship between a camera coordinate system and the object coordinate system according to a geometrical relationship between coordinates of key points of the object in the object coordinate system and the two-dimensional posture information of the object comprises:
  enabling the coordinates of the key points of the object in the object coordinate system and the projection coordinates on the image to respectively constitute 3D-2D coordinate pairs of respective key points;
  using a geometrical correspondence relationship of 3D-2D coordinate pairs of at least partial key points to determine a rotation matrix R and a position translation vector t from the object coordinate system to the camera coordinate system.

15. The device according to claim 14, wherein the using a geometrical correspondence relationship of 3D-2D coordinate pairs of at least partial key points to determine a rotation matrix R and a position translation vector t from the object coordinate system to the camera coordinate system comprises:
  using the geometrical correspondence relationship of 3D-2D coordinate pairs of m key points to form m groups of equations, m being a positive integer;
  using a PnP algorithm to solve said m groups of equations, to obtain the rotation matrix R and the position translation vector t from the object coordinate system to the camera coordinate system, wherein the object is represented with n points in a three-dimensional space and m≥n.

16. The device according to claim 15, wherein during use of the PnP algorithm to solve said m groups of equations, a Random Sample Consensus RANSAC algorithm is employed to select a solution with a maximum interior point rate.

17. A non-transitory storage medium including computer-executable instructions, the computer-executable instructions, when executed by a computer processor, being used to execute a three-dimensional posture estimating method, wherein the method comprises:
  obtaining two-dimensional posture information of an object in an image and three-dimensional size information of the object, wherein the three-dimensional size information comprises length, width and height of the object;
  determining coordinates of key points of the object in an object coordinate system according to the three-dimensional size information of the object, the coordinates of key points of the object are represented according to the length, width and height of the object; and
  determining a transformation relationship between a camera coordinate system and the object coordinate system according to a geometrical relationship between coordinates of key points of the object in the object coordinate system and the two-dimensional posture information of the object,
  wherein the two-dimensional posture information of the object in the image comprises: a minimum two-dimensional rectangular box in the image that can enclose the object;
  the method further comprises: obtaining a rotation angle yaw of the object about the camera coordinate system based on a deep learning method, and
  wherein the determining a transformation relationship between a camera coordinate system and the object coordinate system according to a geometrical relationship between coordinates of key points of the object in the object coordinate system and the two-dimensional posture information of the object comprises:
  determining a rotation matrix R from the object coordinate system to the camera coordinate system according to the yaw;
  determining a position translation vector t from the object coordinate system to the camera coordinate system, according to a coordinate relationship between the minimum two-dimensional rectangular box and key points of the object falling at the minimum two-dimensional rectangular box, and the R, and
  wherein the determining a position translation vector t from the object coordinate system to the camera coordinate system, according to a coordinate relationship between the minimum two-dimensional rectangular box and key points of the object falling at the minimum two-dimensional rectangular box, and the R, comprises:
  with respect to sides of the minimum two-dimensional rectangular box, using the R and internal parameters of the camera to form four groups of equations, each group of equation reflecting a positional relationship between key points falling at the minimum two-dimensional rectangular box and the two-dimensional rectangular box;
  using a least square method to solve the four groups of equations, and determining the t.

* * * * *